(12) United States Patent
Suzuki et al.

(10) Patent No.: US 6,227,968 B1
(45) Date of Patent: May 8, 2001

(54) DANCE GAME APPARATUS AND STEP-ON BASE FOR DANCE GAME

(75) Inventors: Toshifumi Suzuki, Amagasaki; Katsunori Okita; Kazuya Takahashi, both of Kobe; Toru Takeda, Osaka, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/358,335

(22) Filed: Jul. 21, 1999

(30) Foreign Application Priority Data

Jul. 24, 1998 (JP) .................................. 10-209879

(51) Int. Cl.[7] .................................................. A63F 13/00
(52) U.S. Cl. .................................. 463/7; 434/250; 482/8
(58) Field of Search ........................... D12/203; 434/250, 434/257; 273/444, 447; 473/269; 482/8; 463/7, 36; 200/86.5; 600/592

(56) References Cited

U.S. PATENT DOCUMENTS

| | | | |
|---|---|---|---|
| 4,720,789 | * | 1/1988 | Hector et al. ........................ 364/410 |
| 5,076,584 | | 12/1991 | Openiano . |
| 5,139,261 | | 8/1992 | Openiano . |
| 5,667,459 | | 9/1997 | Su . |
| 6,001,013 | * | 12/1999 | Ota ........................................ 364/7 |
| 6,039,658 | * | 3/2000 | Cecchin .................................. 73/269 |
| 6,116,908 | * | 9/2000 | Takai ..................................... 434/250 |

FOREIGN PATENT DOCUMENTS

| | | |
|---|---|---|
| 55-137666 | 10/1980 | (JP) . |
| 57-33897 | 7/1982 | (JP) . |
| 62-213784 | 9/1987 | (JP) . |
| 7-22611 | 3/1995 | (JP) . |
| 9-325674 | 12/1997 | (JP) . |

\* cited by examiner

Primary Examiner—Jessica J. Harrison
Assistant Examiner—Alex F. R. P. Rada, II
(74) Attorney, Agent, or Firm—Jordan and Hamburg LLP

(57) ABSTRACT

Rhythm sensations can be represented in time to music by using the entire body and to create powerfulness and rhythm sensations. Stepping position indication data which is set by a rhythm setting section is read from a stepping position indication data memory, and the stepping position instruction contents are scrolled and displayed on a monitor by a scroll display control section, thereby performing instructions of the stepping position and the stepping operation timing. When the fact that a player steps on a step-on base section in accordance with the display contents of the monitor is detected by a cable switch and this is input from a stepping operation monitor section, a score proportional to the timing deviation is calculated by an amount-of-deviation detection/totaling section, and next, an evaluation is performed by the rhythm setting section. Then, the next stepping position indication data is set according to the evaluation result.

14 Claims, 13 Drawing Sheets

ONE SET DATA FORMED OF FOUR BEATS

DIFFICULT ↕ EASY

DANCE IMAGE

DIFFICULT ↕ EASY

DANCE GAME APPARATUS AND STEP-ON BASE FOR DANCE GAME

BACKGROUND OF THE INVENTION

1. Field of the Invention

The present invention relates to a game apparatus formed in such a manner as to guide a player to step (movement of feet) so as to dance. More particularly, the present invention relates to a dance game apparatus which creates dance sensations when a player steps on a step-on base in time with an announced piece of music (rhythm) and to a step-on base which can be used for the game.

2. Description of the Related Art

In recent years, rendition game machines are known which are made to perform rendition operations which imitate those by a disc jockey such that an operation panel section is provided in the nearly central portion in the height direction of a game housing, a stored piece of music is played, a plurality of keys which imitate a keyboard, provided on the operation panel, are played in time to this playing, and a slide disc is turned. More specifically, this is a game in which the rendition contents are visually instructed in accordance with the progress of the piece of music which is played, and the rendition operation is actually performed in accordance with this instruction; as a result, the correlation between the music which is played and the actual rendition operation by the player is checked to evaluate the rendition operation of the player.

However, the above-mentioned game apparatus is only a game machine which has nearly the same construction as that of a conventional housing provided in an amusement center, etc., and in which the software which is the game contents and the construction of the operation panel of the apparatus are changed slightly, and also is only a game apparatus in which the degree of achievement of the rendition effect as to how fast the player operates the instructed keys and disks without errors in accordance with the visually instructed contents in time with the progress of the piece of music being played is evaluated.

SUMMARY OF THE INVENTION

An object of the present invention, which has been achieved in view of the foregoing, is to provide a dance game apparatus which adopts a floor panel construction capable of simulating rhythm sensations in time to the music and which is powerful and creates rhythm sensations by using the entire body and by performing stepping according to the contents which are instructed in sequence, and to provide a step-on base which is suitably used for the game.

To achieve the above-mentioned object, according to one aspect of the present invention, there is provided a dance game apparatus comprising music output means for outputting one piece of music from at least one stored piece of music; a floor panel having a step-on base section; and guidance means for performing a stepping operation instruction to the step-on base section in time with the music. According to the present invention, stepping operation instruction contents are guided in sequence from the game apparatus by using at least one of various media, such as display, light, sound, etc. The player is able to recognize the stepping operation instruction content which is guided. Receiving the stepping operation information which is guided in sequence, the player steps on the step-on base section of the floor panel. The stance of a player stepping on the step-on base section as instructed looks like that of dancing using the whole body, and it becomes powerful and compelling, depending upon the level of skill. This shows great power for step dance practice.

According to another aspect of the present invention, there is provided a step-on base for a dance game, comprising a top panel, a support member for supporting the panel, detection means for detecting the action of a load on the panel, wherein the detection means comprises stepping sensors between the panel and the support member at mutually opposing positions of the panel. According to the present invention, as a stepping sensor, a switch may be used which causes a moving-toward/away section to perform a moving-toward/away operation by using a pressure-sensitive element using a piezoelectric member and elastic deformation. If such stepping sensors are disposed at opposing edge positions of the panel, even if any position of the panel is stepped on during dancing, that is, even if a position deviating from the center of the panel is stepped on, the stepping operation is suitably detected by the stepping sensor on a side nearer thereto.

The above and further objects, aspects and novel features of the invention will become more apparent from the following detailed description when read in connection with the accompanying drawings.

BRIEF DESCRIPTION OF THE DRAWINGS

FIG. 6A is a diagram showing a state in which a large amount of stepping position indication data is stored in a table form in such a manner as to correspond to the level of difficulty; and FIG. 6B is a diagram showing a state in which a plurality of dance images are stored in a table form in such a manner as to correspond to the level of difficulty.

FIG. 10A is a diagram showing a state in which an evaluation point is increased and is maintained at a high level; and FIG. 10B is a diagram showing a state in which an evaluation point is slightly increased but thereafter is maintained at a low level.

DESCRIPTION OF THE PREFERRED EMBODIMENT

Figure 2:
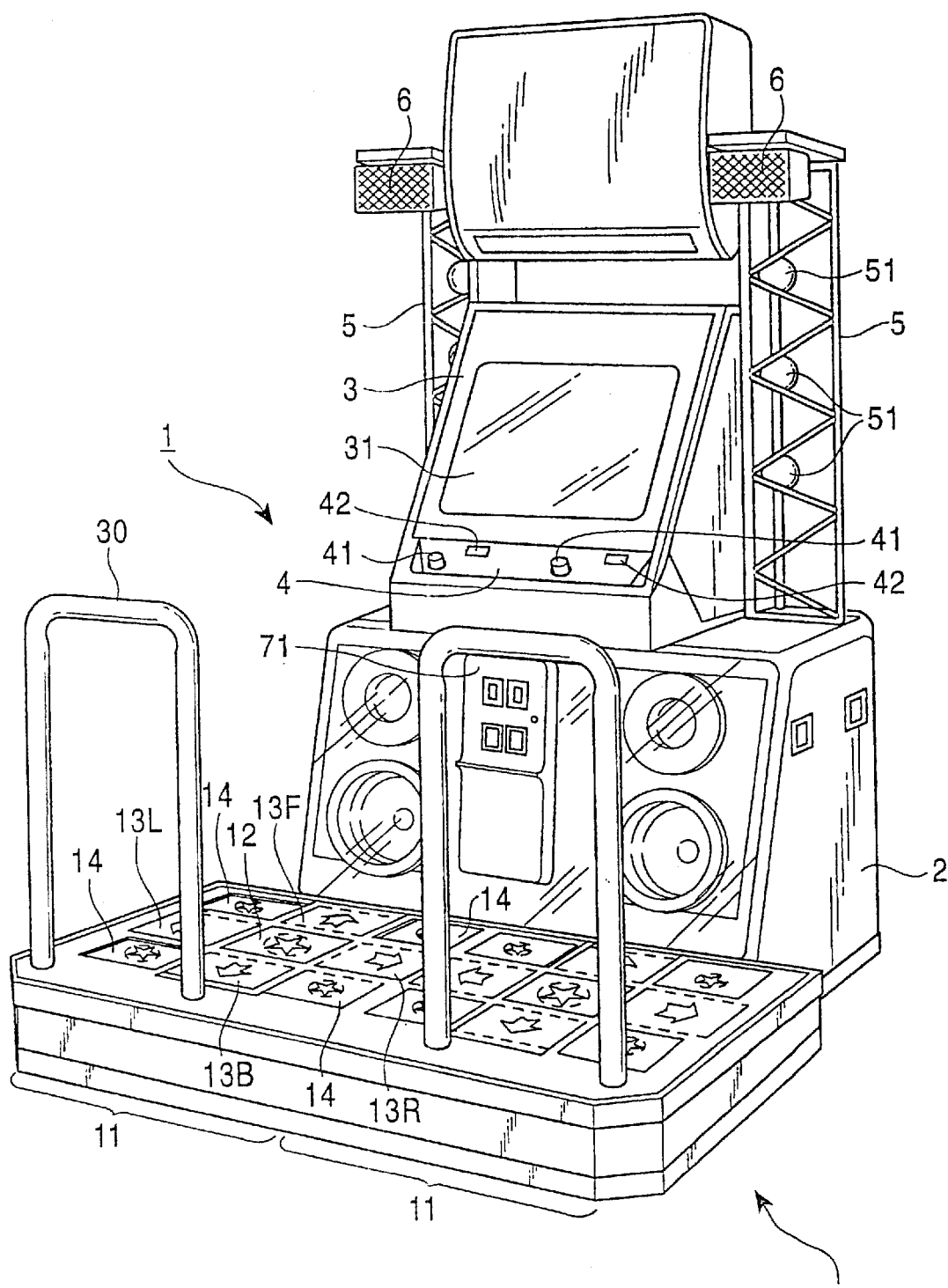
FIG. 2 is an overall exterior view of a dance game apparatus of the present invention.

FIG. 2 is an overall exterior view of a dance game apparatus of the present invention. This game apparatus (or this game system) comprises an audio image output main unit 1 and a floor panel 10 disposed in front thereof.

The audio image output main unit 1 comprises a housing section 2 for outputting rhythm sounds in the lower portion thereof, a monitor 3 in the upper portion thereof, a guidance section 4 provided on the panel surface in the lower portion of the monitor 3, cylindrical bodies 5 which are provided upright on both sides of the monitor 3 and which are provided with electric decorative lamps 51, etc., at suitable places, and speakers 6 for music performance, which are disposed in the upper portion of each cylindrical body 5. Coin slots 71 are prepared at the central positions in the side-to-side direction of the housing section 2, two coin slots being disposed on the right and left in consideration of a two-play mode.

Figure 3:
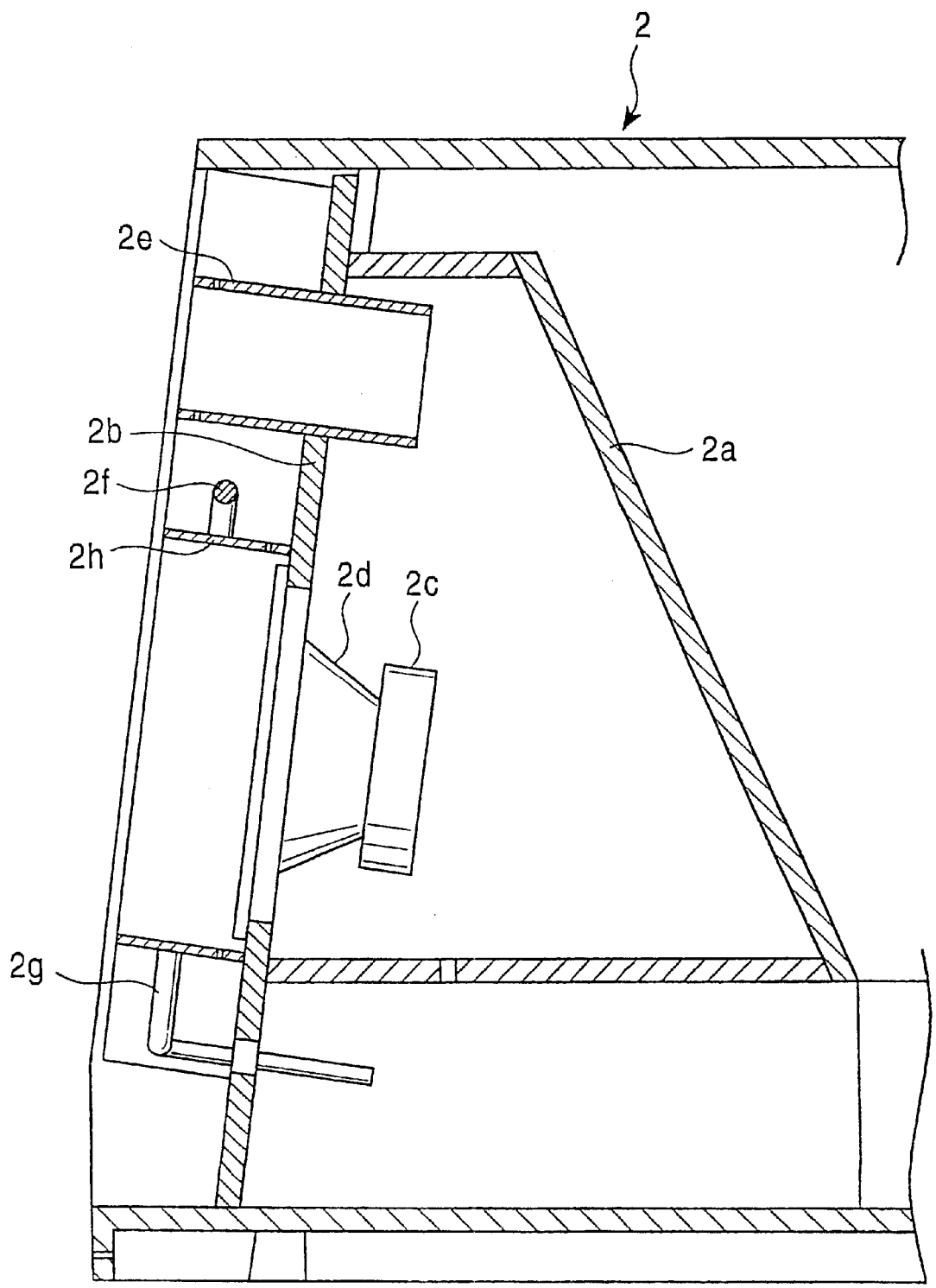
FIG. 3 is a partial side sectional view showing the construction of a housing section.

The construction of the housing section 2 is described with reference to FIG. 2, and FIG. 3 which is a partial side sectional view. A box 2a for resonance is disposed in the middle in the height direction within the housing section 2. A rhythm speaker 2c for low frequencies is mounted in the nearly central portion of a front plate 2b of the box 2a for resonance with a horn 2d facing the forward. Above the front plate 2b, a cylinder 2e which sends the resonance sound forward is disposed in a going-through state. The speaker 2c produces rhythm sounds at a predetermined low frequency, and outputs heavy low-pitched sounds in the direction of a floor panel 10 in front by causing the cylinder 2e and the front plate 2b to vibrate by using the resonance space in the back portion thereof. This rhythm speaker 2c produces the rhythm of the output music as heavy low-pitched sounds. On the front side of the front plate 2b, an annular fluorescent tube 2f which is capable of flashing is disposed on the front plate 2b. The fluorescent tube 2f is mounted to a cylindrical fluorescent-tube support member 2h which is mounted in such a manner as to surround the end of the horn 2d of the front plate 2b. This fluorescent tube 2f is a long tube in which its intermediate portion is formed annularly and both end portions 2g are formed in parallel, with the both end portions 2g being positioned at the bottom end in FIG. 3. Power-supply lines (not shown) are connected to these ends so as to allow flashing.

The monitor 3 is mounted at a height at which a display surface 31 is positioned at a position of nearly the same height as the height of the eye of the player having a standard height who stands on the floor panel 10, and a guidance section 4 is disposed in the lower portion thereof. When starting the game, since the titles of pieces of music which can be selected are displayed in a list on the display surface 31 of the monitor 3, the guidance section 4 is used to select a desired piece of music from among them. That is, the guidance section 4 instructs the movement of the cursor which is displayed on the display surface 31 up and down or from side to side. By operating a joy stick 41 so as to tilt and by pressing a decision button 42 in a state in which the cursor is made to set to the display position of the piece of music to be selected, the music title can be selected. The guidance sections 4 are provided with the joy stick 41 and the decision button 42 each on the right and left. This is for allowing a player to select any position of right and left during one-person play and for allowing a player at either side to perform an operation for selecting a piece of music during two-person play. For the selection of the music title, a method may be used in which a transparent tablet using a piezoelectric material on top of the display surface 31 is disposed and the transparent tablet is pressed by a finger, etc., of the player to specify the piece of music which is displayed at the pressed place.

Also, the speakers 6 output the introduction and the music (only the performance or vocals included) of the selected piece of music. The speakers 6 may be made to perform rhythm output (which will be described later) in such a manner as to dually serve for the music performance.

Next, a description is given of the construction of the floor panel 10.

The floor panel 10 is formed as a flat plate with a predetermined height, as shown in FIG. 2, and dance areas 11, which are divided into 3×3 squares in the front and back and from side to side in plan view, are formed for two persons on the right and left. The dance areas 11 on the right and left have the same construction. Of nine squares in the dance areas 11, arrows indicating the direction when viewed from the center square are drawn on step-on base sections 13 (13F, 13B, 13R, and 13L), which are four squares at the front and back positions and at right and left positions with respect to the home position section 12 corresponding to the center square on which a large star-shaped mark is drawn, and a small star-shaped mark is drawn on auxiliary base sections 14, which are four squares in an oblique direction when viewed from the home position section 12. Inverted-U-shaped members, which are provided upright on the right and left on the front side in FIG. 1 of the floor panel 10, are handrails.

Figure 4:
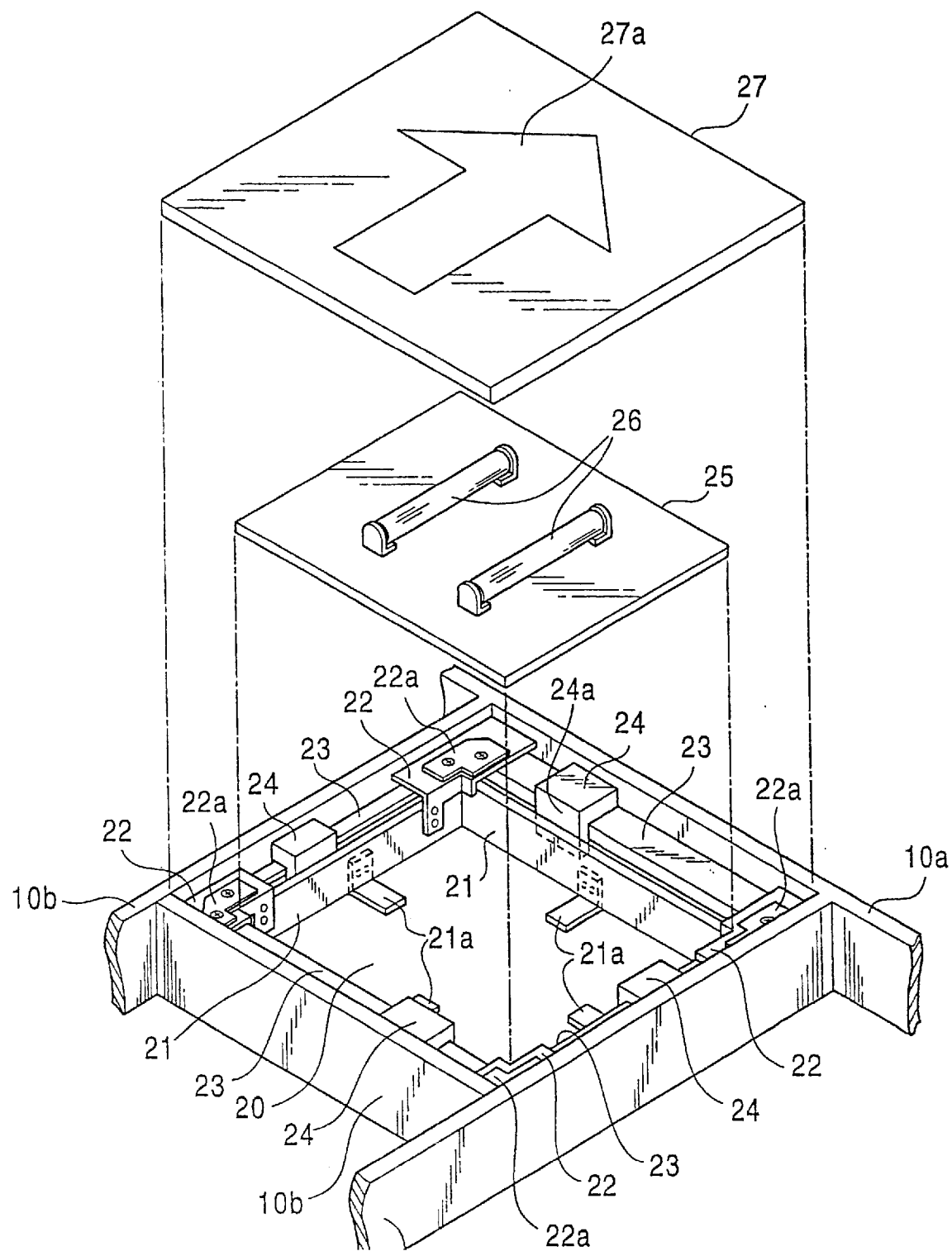
FIG. 4 is a perspective exploded view showing the internal construction of a step-on base section of a floor panel.

FIG. 4 is a perspective exploded view showing the internal construction of the step-on base section 13 of the floor panel 10. The step-on base sections 13F to 13L have the same construction, and a description is given by using the step-on base section 13F as an example.

In the floor panel 10, the inside of a rectangular external frame 10a is divided into squares of nearly regular-square shape by a dividing plate 10b. The step-on base section 13F has a bottom plate 20 on the bottom of the internal space thereof surrounded by the external frame 10a and the dividing plate 10b, a rectangular internal frame 21 which is smaller than the external frame is provided upright above the bottom plate 20, and furthermore, corner members 22 are strongly fixed to the four corner portions of the internal frame 21 so as to support the internal frame 21 between the external frame 10a and the dividing plate 10b in such a manner as to extend across adjacent frames. Such basic support construction ensures strength capable of supporting the weight of the player standing thereon.

A clearance of a predetermined width is formed between the internal frame 21, and the external frame 10a and the dividing plate 10b, a flat plate (although not shown in the figure) is laid in the area of the rectangular frame formed by this clearance, and on the top surface of each flat plate, cable switches 23 serving as stepping operation detection means to be described later are arranged in such a manner as to be parallel to each edge and of a length nearly equal to that of each edge. At the mounting height position of the corner members 22, a clearance into which the cable switches 23 can be inserted below them is formed in a section adjoining the above-mentioned flat plate which is not shown, and both ends of the cable switch 23 are positioned below this corner member 22.

On the top surface of the cable switches 23, an L-shaped load receiving member 24 is disposed in such a manner as to be slidable in an up-and-down direction by an upright section 24a. The load receiving member 24 is set to a length of, for example, approximately ½ to ⅓ of the longer dimension of the cable switch 23. The provision of the load receiving member 24 makes it possible to provide an appropriate load in relation to the detection sensitivity as a result of the load being concentrated on an area of this load receiving member 24 in plan view even when the weight of the player is applied to the entire surface of the cable switch 23 and the load per unit area is reduced.

A height adjustment plate 22a having a thickness such that it is slightly lower than the height of the load receiving member 24 when no load is applied thereon and having a thickness such that it is nearly equal thereto by considering the flexing of the top plate 27 (to be described later) is laid on the top surface of the corner members 22. The height of the top surface of the height adjustment plate 22a is set at a position lower by approximately an amount corresponding to the thickness of the top plate 27 (to be described later) than the height of the top end of the external frame 10a and the dividing plate 10b.

Two cold cathode-ray tubes 26 having long service life are provided side by side on the top surface of a support plate 25. This support plate 25 is placed and fixed onto a mounting piece 21a which is extended inward from the bottom end of each internal frame 21.

Reference numeral 27 denotes a top plate made of an acrylic plate, etc., which is placed on the height adjustment plate 22a. An arrow mark 27a indicating "forward" is drawn on the top plate 27 in a color different from that of the surrounding, etc. The top plate 27 obtains electric decorative effects by switched-on light from the cold cathode-ray tubes 26 in the back portion, and is subjected to surface treatment such that semi-transparency (or the surface is coated with a coloring material) is provided so that the internal construction of the step-on base section 13 cannot be seen, or random reflections are produced on the surface of the rear side.

When the player steps on the top plate 27, the load at the time is transmitted to the cable switch 23 via the load receiving member 24.

Since the auxiliary base section 14 which can secure a dance floor area of a predetermined area which is flush with the step-on base section 13 is sufficient, there is no need to provide detection means for detecting the presence or absence of a load, and a construction may be adopted which comprises a bottom plate 20, an internal frame 21, and corner members 22 and which is capable of at least supporting the top plate 27 on the top surface. As the top-plate support construction, another construction may be used, for example, a construction in which a component corresponding to the internal frame 21 is provided in the inside space, a frame having a number of bridges in a matrix is disposed in a standing manner and a top plate is placed thereon, and furthermore, a construction in which a filler is loaded in the inside space and a top plate is placed thereon.

Figure 5:
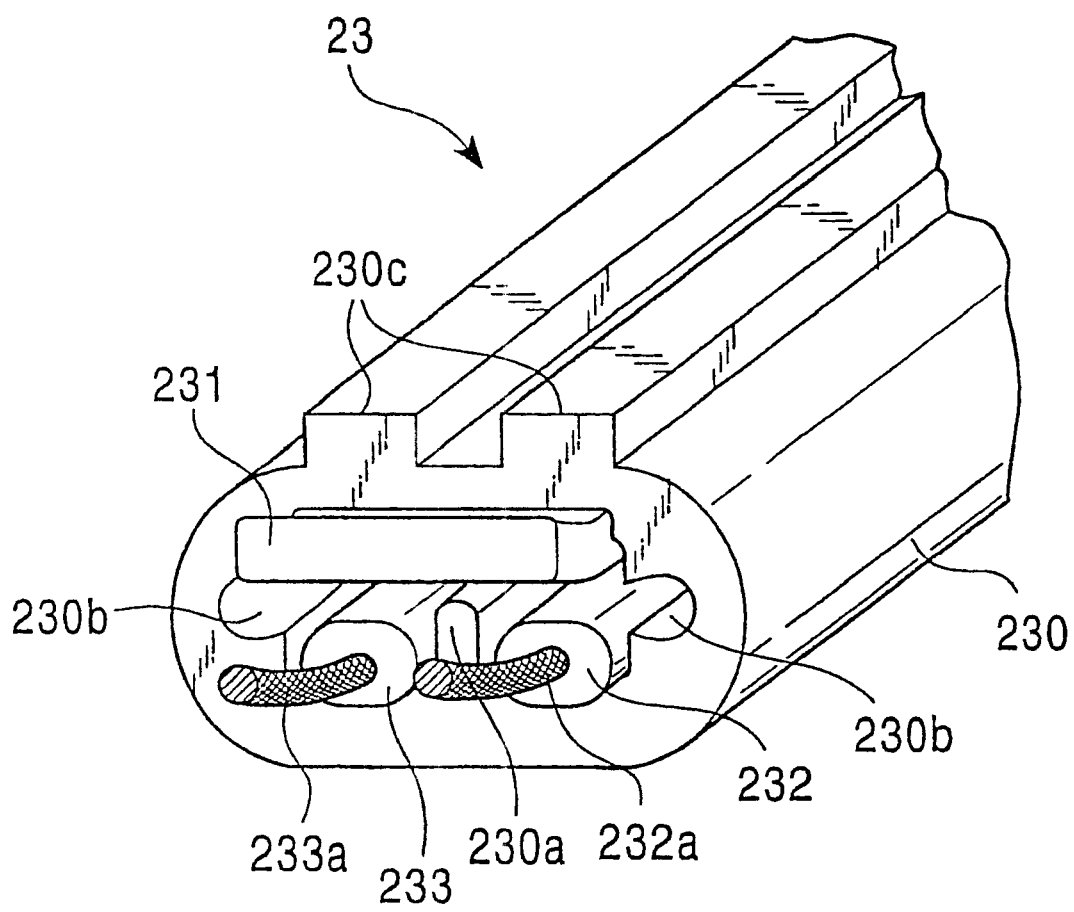
FIG. 5 is a construction diagram showing an example of a cable switch.

FIG. 5 is a construction diagram showing an example of the cable switch 23. The cable switch 23 comprises a cylindrical sheathing-section 230, and a relay conductive section 231, a first conductive section 232, and a second conductive section 233, which are arranged within the cylinder.

The sheathing section 230 is formed from an elastic material, such as silicone. The sectional shape of the cylindrical portion thereof is an oblate circle, and a protruding piece 230a which extends nearly up to the center of the cylindrical section toward the opposing inner wall from one of the inner walls at the intermediate position in the direction of the long axis of the section is protrudingly provided, and cutouts 230b for assisting the flexing in a direction in which the oblate shape is further crushed are formed at both ends in the direction of the long axis of the section. On the external surface in the upper portion, two beams of projection portions 230c along the direction of the longer length are protrudingly provided as portions for receiving a load.

The relay conductive section 231 is a long sheet formed with a rubber material, such as silicone, as principal constituents with which, for example, metallic powder is mixed, the relay conductive section being disposed in the upper portion of the inside of the oblate cylinder of the sheathing section 230. The first and second conductive sections 232 and 233 have the same construction, with a pair thereof being disposed spaced at a predetermined interval on the right and left sides of the protruding piece 230a on the lower portion of the inside of the oblate cylinder of the sheathing section 230. These first and second conductive sections 232 and 233 are formed with a rubber material, such as silicone, as principal constituents with which, for example, metallic conductive powder is mixed, and are long bars formed such that the sectional shape is an oblate circle from the viewpoint of stability.

The first and second conductive sections 232 and 233 are placed at positions corresponding to the projection portions 230c, and are each effectively brought into contact or are brought into abutment with the relay conductive section 231 as a result of the deformation of the sheathing section 230 by receiving a load applied onto the projection portions 230c. Core materials 232a and 233a, made of copper, as conductive materials, are buried inside the first and second conductive sections 232 and 233, so that the strength is ensured and an amount of resistance per unit length with respect to the direction of the longer dimension can be reduced, that is, the output of the detection voltage can be detected as a nearly constant value regardless of the position at which the load is received, ensuring high detection accuracy. Since the clearance dimension between the relay conductive section 231 and the first and second conductive sections 232 and 233 can be designed to be as small as 1 to 2 millimeters, stroke can be sufficiently decreased in comparison with, for example, a mechanical switch comprising a movable contact piece.

With the construction of the above-described step-on base section 13, when the foot of the player steps on the top plate 27 and the load is transmitted to at least one of the four cable switches 23 disposed at the four edges, the upper portion of the sheathing section 230 of the cable switch 23 is deformed as a result of receiving the load to the downward, and the relay conductive section 231 contacts (changes from OFF to ON) both the first and second conductive sections 232 and 233, thereby performing stepping-on detection.

More specifically, the detection of the presence or absence of the load by the cable switch 23 is performed in such a way that a voltage is applied to both the core materials 232a and 233a of the first conductive section 232 and the second conductive section 233 (one of them may be grounded) via a terminal (not shown), in a state in which a load is not applied, since both the first and second conductive sections 232 and 233 maintain a clearance state with the relay conductive section 231 and are therefore electrically open, the applied voltage is detected as it is by a voltage detection section (a stepping operation monitor section 112 in FIG. 1, which will be described later) (not shown), and in contrast, even if a load is applied and the section between the first and second conductive sections 232 and 233 contacts the relay conductive section 231 at any position, the section between the first and second conductive sections 232 and 233 is electrically short-circuited, and as a result, the voltage detection section detects that a voltage difference disappears.

Figure 1:
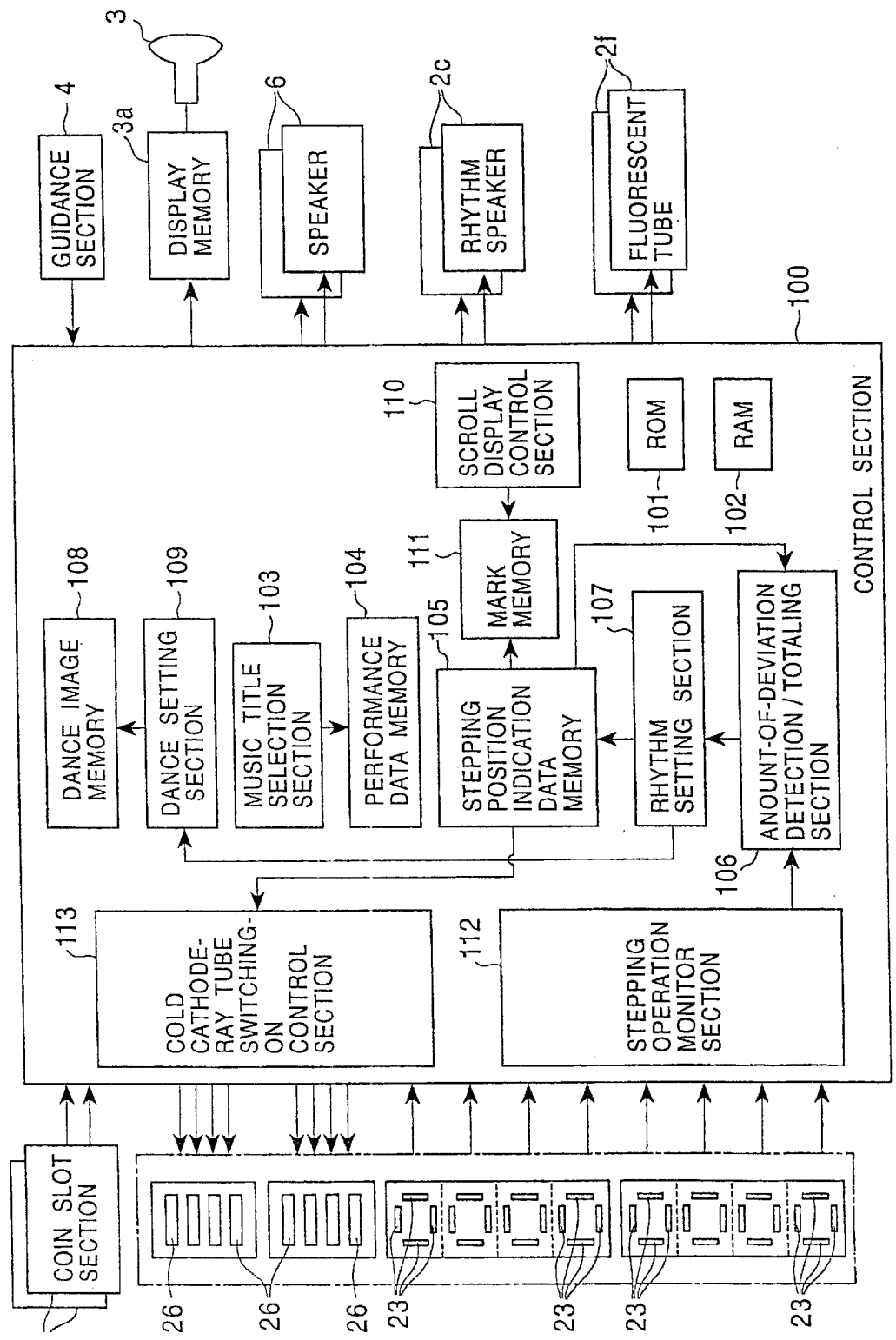
FIG. 1 is a block diagram of a dance game apparatus of the present invention.

FIG. 1 is a block diagram of a dance game apparatus of the present invention.

A control section 100 formed of a computer, etc., is disposed at an appropriate location inside an audio image output main unit 1. The control section 100 centrally processes operation control of this game apparatus.

The control section 100 comprises a ROM 101 of a built-in or removable type for storing a game program, and a RAM 102 for temporarily storing processing data. As a recording medium for storing a game program, a CD-ROM, a floppy disk, a hard disk, etc., may be used.

A music title selection section 103 performs a process for selecting the corresponding title of the music upon receiving an instruction signal from the guidance section 4. A performance data memory 104 stores music data for each music title, that is, performance data of each piece of music, in such a manner as to correspond to the title of the music, so that the performance data of the specified piece of music when a selection signal from the music title selection section 103 is received is output to speakers 6 in a time series manner.

Figure 6A:
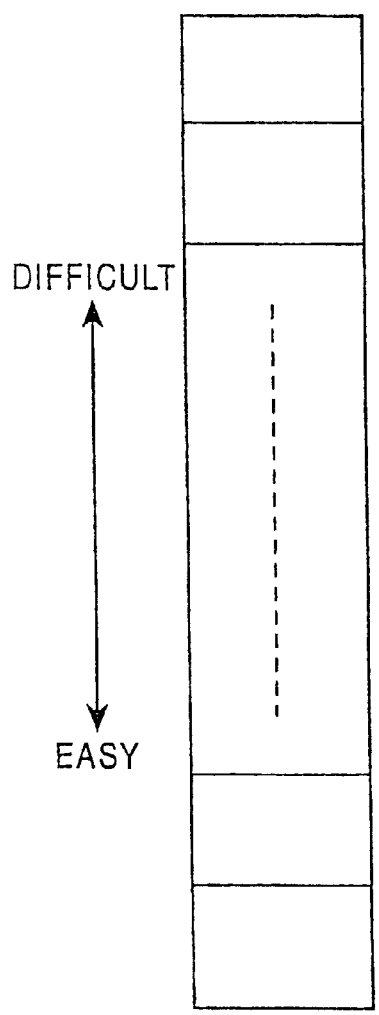
FIGS. 6A and 6B show a memory map.

A stepping position indication data memory 105 stores a large amount of stepping position indication data corresponding to rhythm, such as the number of beats (for example, four beats, eight beats, etc.) in the form of a table in such a manner as to correspond to the level of difficulty, as shown in FIG. 6A. The tables storing this stepping position indication data are prepared, in addition to the number of types of the number of beats, for different rhythms of the same number of beats, for example, for types of the music of the pieces of music, or in a number corresponding to each piece of music. In the case of four beats, in each stepping position indication data, one set of data is formed of four instruction contents in a time series manner, and in the case of eight beats, in each stepping position indication data, one set of data is formed of eight instruction contents in a time series manner. One set of data is each written into each square of the table of FIG. 6A. Also, from the point of view of rhythm, in the case of four beats, various rhythms are prepared, for example, all the four beats have the same intervals, or the initial two beats are short and the subsequent two beats are long. The stepping position indication data having the same rank of difficulty is preferably prepared for a plurality of types. Then, a table corresponding to the piece of music specified by the music title selection section 103 is selected, and in this embodiment, one set of data within the selected table is output to the rhythm speakers 22 and the cold cathode-ray tubes 26.

An amount-of-deviation detection/totaling section 106 measures, by an internal timer, etc., an amount of deviation (the timing deviation in this embodiment) from the result in which the stepping operation instruction and the actual stepping operation are performed, and determines the amount of added-up deviation with respect to the stepping position indication data for one set of data. A rhythm setting section 107 performs evaluation so that the level of one set of data which is set earlier by two sets of data with respect to the third or subsequent one set of data is increased or decreased by one rank, as will be described later in accordance with the totaling result from the amount-of-deviation detection/totaling section 106 with respect to the first stepping position indication data, and outputs the result as a setting signal. Furthermore, the setting signal from this rhythm setting section 107 is also output to the dance setting section 109.

Figure 6B:
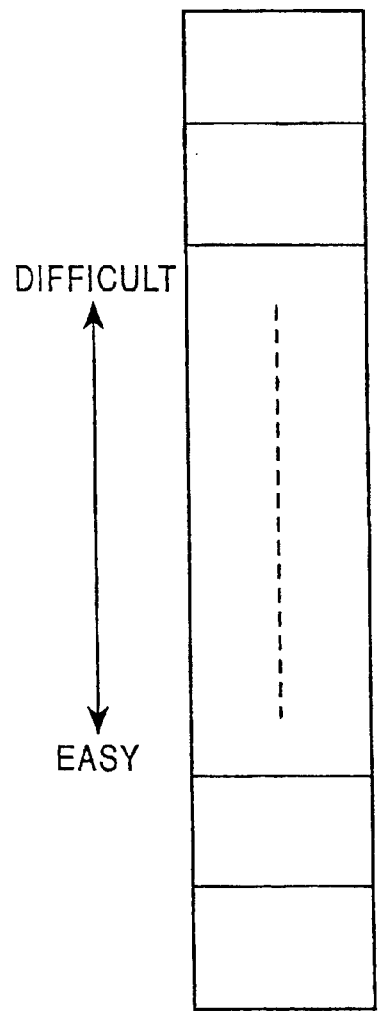

The dance image memory 108 stores a dance image displayed on the display surface 31 of the monitor 3 for each amount corresponding to one set of data and has tables for storing dance images corresponding to the title of the music or rhythm. A plurality of dance images of each table are stored in such a manner as to correspond to the level of difficulty, as shown in FIG. 6B. Also, it is preferable that a plurality of dance images, whose difficulties are at the same rank, be prepared. Receiving a setting signal corresponding to the level of difficulty from the rhythm setting section 107, a dance setting section 109 reads dance images for an amount of the third or subsequent one set of data from the selected table.

A scroll display control section 110 is used to perform scroll display on the display surface of the monitor 3. The stepping position indication data for one set of data, which is set by the rhythm setting section 107, read from the stepping position indication data memory 105, is replaced with image data (hereinafter referred to as "stepping position indication marks") and is temporarily input to a mark memory 111. In this mark memory 111, an amount of two sets of data which are continuous so that the images of the stepping position indication marks are always displayed without interruption on the display surface 31 of the monitor 3 in scroll display is written. The scroll display control section 110 causes a stepping position indication marks from the mark memory 111 to be written as scroll images into a display memory 3a in such a manner that the reading addresses are shifted sequentially at predetermined time intervals. In this manner, in addition to dance images which are not scrolled, stepping position indication marks which are scrolled are also transferred in sequence to the display memory 3a, and furthermore, the contents of the display memory 3a are repeatedly read and displayed by known display scanning means at a cycle, such as 1/60 seconds, and on the display surface 31, the stepping position indication mark is scrolled and displayed on the display surface 31 and the dance image is displayed in a moving-picture manner as a background image.

Figure 7:
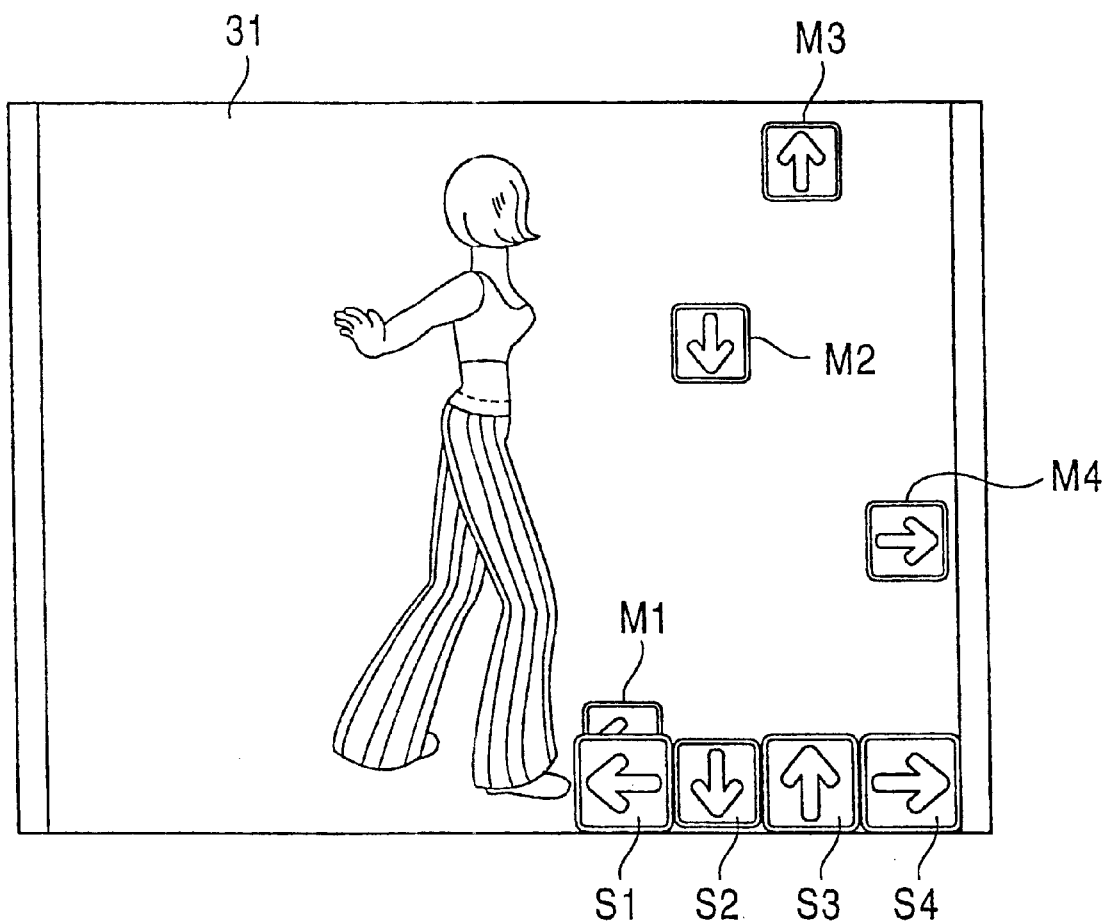
FIG. 7 shows an example of a display surface, also showing a game screen in a case in which a player plays a game in a dance area on the right side of FIG. 2.
Figure 8:
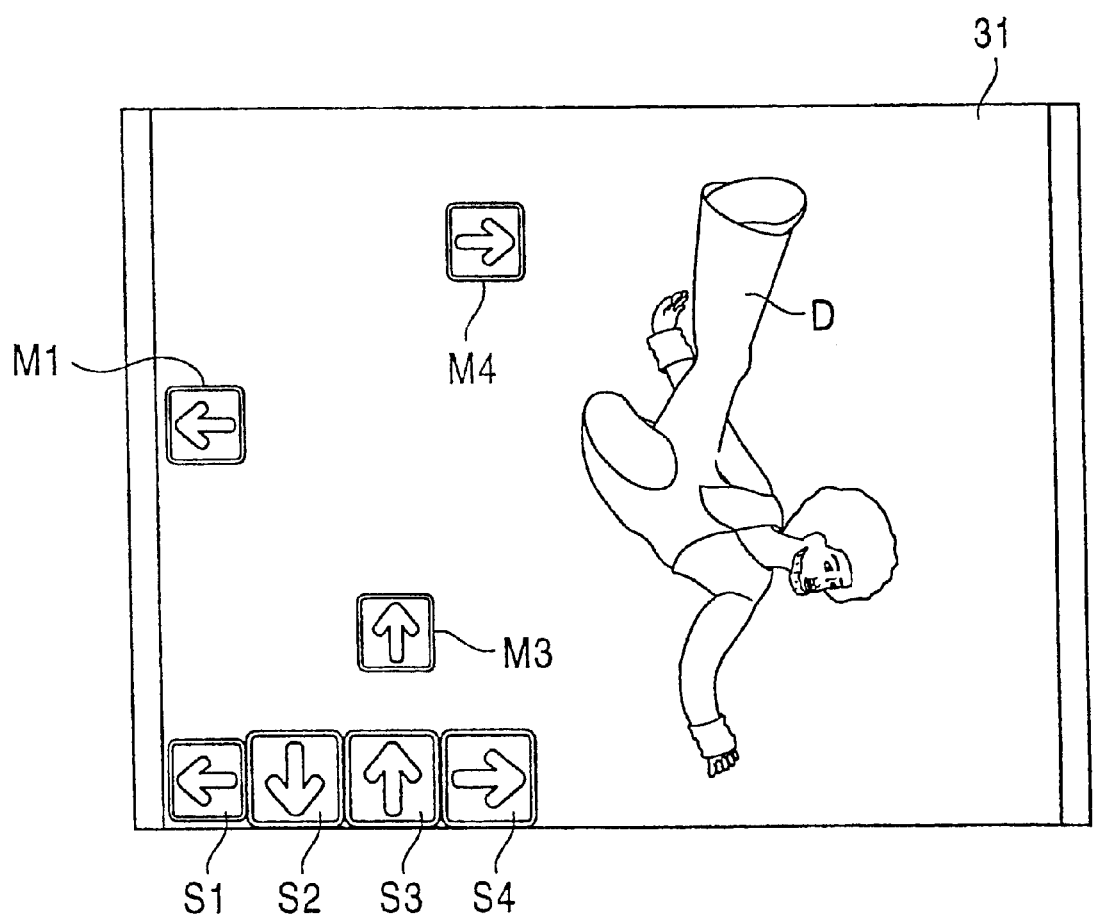
FIG. 8 shows an example of a display surface, also showing a game screen in a case in which a player plays a game in a dance area on the left side of FIG. 2.
Figure 9:
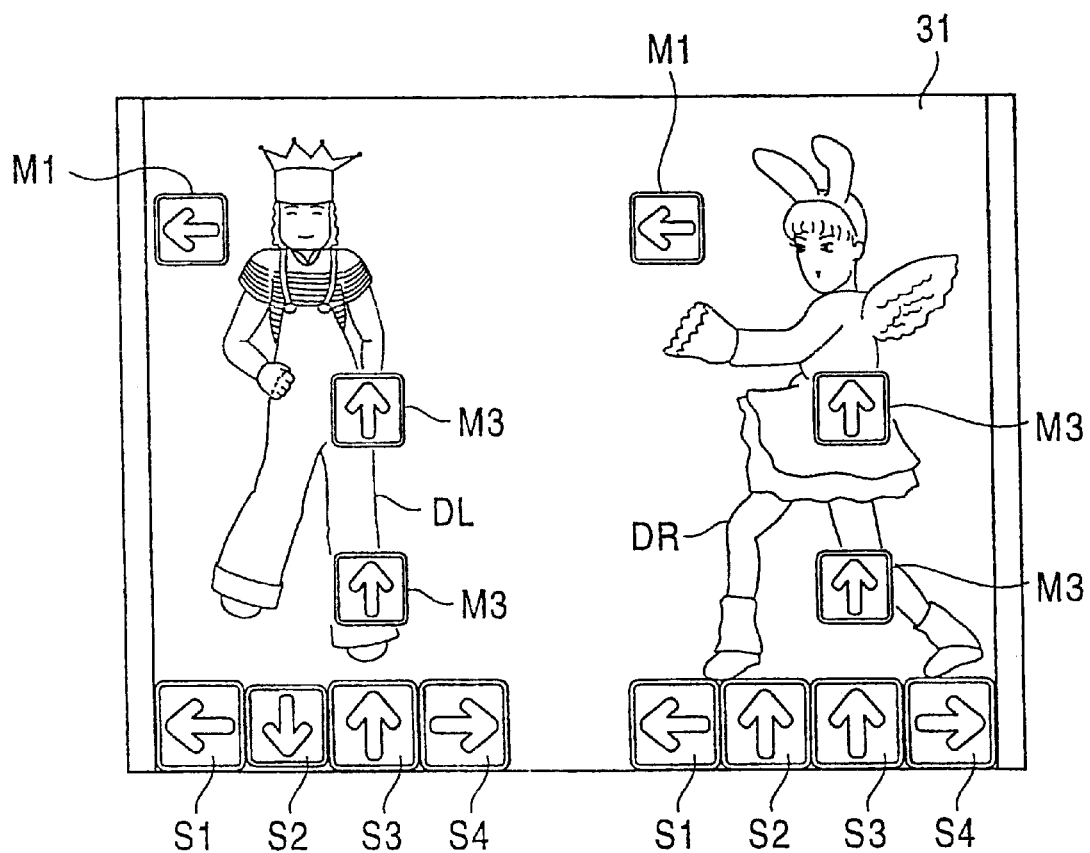
FIG. 9 shows an example of a display surface, also showing a game screen in the case of two-person play.

FIGS. 7 to 9 show an example (mode of one set of data in four beats) of the display surface 31. In FIG. 7, a case is shown in which the player plays a game in the dance area 11 on the right side of FIG. 2, and the background of a dance image D and the stepping position indication marks M1 to M4 which are scrolled downward at a predetermined speed in sequence from the top of the screen are displayed in the sequence of M1, M4, M2, and M3. Still marks S1 to S4 indicating the left, down, up, and right marks, displayed at the bottom end on the display surface, are used to indicate timing, and the state in which the scrolled mark M completely overlaps (matches) the still mark S guides a stepping operation timing. At the timing at which the mark M completely overlaps the still mark S, the display luminance or the display color of the still mark S is temporarily changed, showing the matching of timing. For the marks M1 to M4, in this embodiment, the mark M1 of the left facing arrow corresponds to a stepping base section 13L, the mark M2 of the downward facing arrow corresponds to a stepping base section 13B, the mark M3 of the upward facing arrow corresponds to a stepping base section 13F, and the mark M4 of the right facing arrow corresponds to a stepping base section 13R. In FIG. 7, the level of difficulty of the dance image is at a relatively low level. In contrast, in FIG. 8, a case is shown in which the player plays a game in the dance area 11 on the left side of FIG. 2, and similarly to that of FIG. 7, a dance image D, the stepping position indication marks M1 to M4, and the still marks S1 to S4 are displayed. In this example, for the stepping position indication marks M, the first mark has already reached the stepping time and cannot be seen; however, instructions are given in the sequence of M3, M1, and M4 from the second mark. In FIG. 8, the level of difficulty of the dance image is at a relatively high level.

Also, FIG. 9 shows a case of two-person play. In this figure, as the stepping position indication marks on the right and left, the same marks are displayed. However, with the progress of the game, marks of levels of difficulty which are different individually are set on the basis of the evaluation for each player, and in accordance therewith, the level of difficulty of the dance image is changed. In FIG. 9, a mode is shown in which marks M3 continuously appear as stepping position indication marks (the first mark has already reached the stepping timing).

The stepping operation monitor section 112 detects whether or not the cable switch 23 placed in the step-on base section 13 has changed from OFF to ON. The stepping operation monitor section 112 processes, as detection data, the ON time of the first which has turned on first with respect to the four inside the step-on base section 13 and detects ON of the cable switch 23 so as to be identifiable in units of each step-on base section 13. A detection operation is made possible for each dance area 11 in order to confirm the stepping position of each player with respect to the mode of two-person play.

A cold cathode-ray tube switching-on control section 113 outputs a switching-on signal for causing the cold cathode-ray tubes 26 disposed in the internal space of the base sections 13F, 13B, 13R, and 13L corresponding to the stepping position indication data from the stepping position indication data memory 105 to be individually switched on and displayed.

Next, referring to the flowcharts in FIGS. 10, and 11 to 13, a description is given of game operation of the game apparatus.

Figure 11:
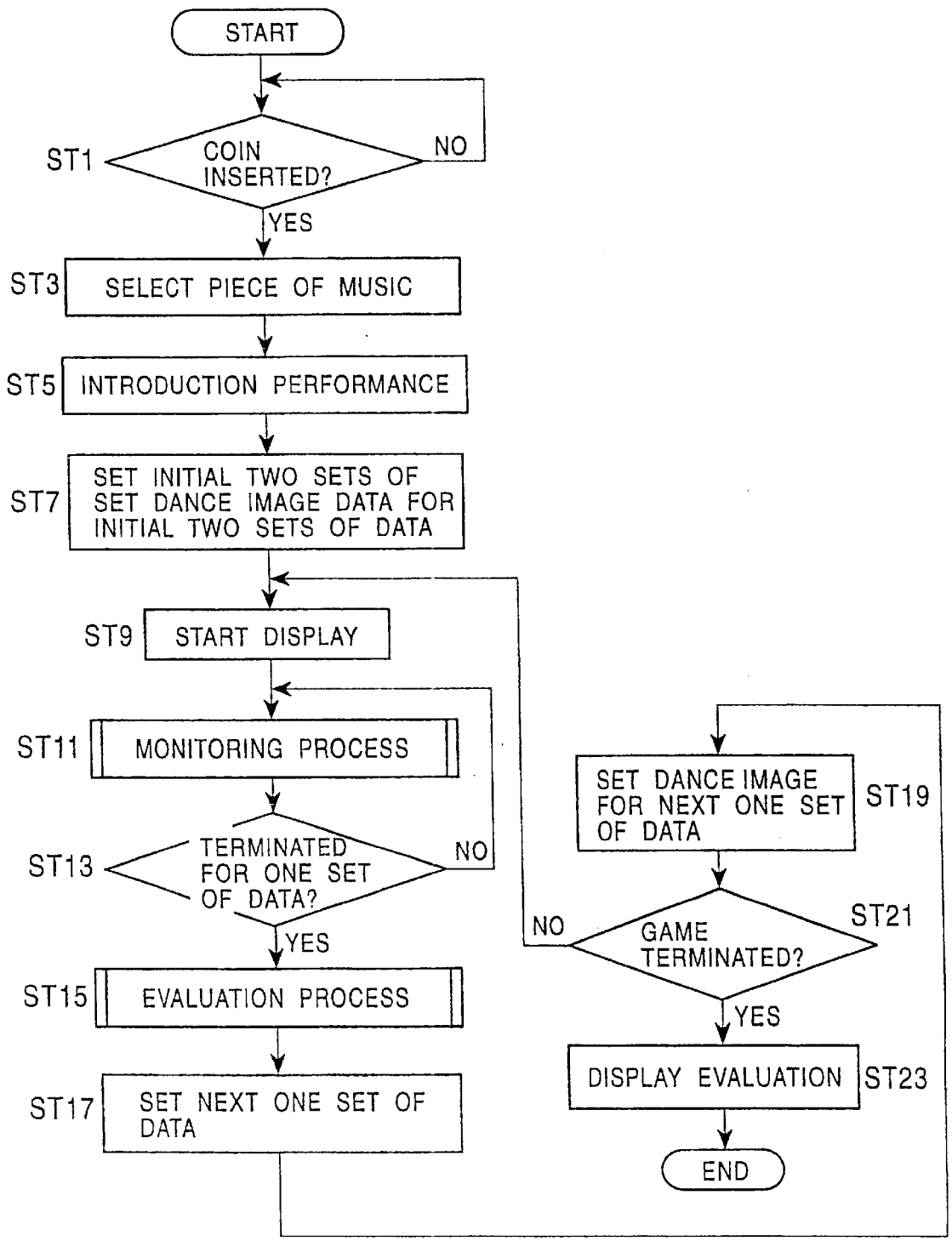
FIG. 11 is a main flowchart illustrating a game operation.

FIG. 11 shows a main flowchart of the game apparatus. Initially, a coin inserted into a coin slot 71 is detected by a coin slot section 7 (step ST1). When the coin insertion is detected, the screen is switched to a music title selection screen (step ST3). In this screen, for example, music titles are displayed across the screen and downward in a list, and when a desired piece of music is selected from among them by using the joy stick 41 and the decision button 42 of the guidance section 4, the music title selection section 103 reads performance data corresponding to the selected music title from the performance data memory 104, temporarily stores it in a RAM 102, and outputs it to the speakers 6 (step ST5). When introduction performance is started, a table having the rhythm of the number of beats corresponding to the selected piece of music is specified from the stepping position indication data memory 105, furthermore, a predetermined position in the table, for example, stepping position indication data having a medium level of difficulty, is set as one set of data for the initial two sets of data, and a dance image corresponding to this rhythm and corresponding to the level of difficulty of the set stepping position indication data is set by the dance setting section 109 (step ST7).

When the initial two sets of data of the stepping position indication data is set, one set of data of them is scrolled and displayed as the stepping position indication mark M on the display surface 31 in such a manner as to be superposed on the background dance image D, as shown in FIGS. 7 to 9 (step ST9). When the scroll display of each stepping position indication mark is started, a monitoring process by the amount-of-deviation detection/totaling section 106 is performed (step ST11). The monitoring process is performed in units of one set of data (step ST13), and when the monitoring result for the one set of data is sent to the rhythm setting section 107, the rhythm setting section 107 performs evaluation on the basis of the monitoring result (step ST15).

Then, receiving the evaluation result, the next one set of data (that is, the third one set of data after receiving the evaluation based on the monitoring result for the first one set of data) is set, and the setting of the dance image D for the one set of data which has been set is performed (steps ST17 and ST19). That is, the stepping position indication mark for one set of data for the object of evaluation has already been scrolled off the monitor 3, and since on the monitor 3, the stepping position indication mark based on the next one set of data is being scrolled and displayed, one set of data which is set based on the evaluation result is set delayed by one set of data.

Next, a determination is made as to whether or not the game has been terminated, that is, whether or not a predetermined time has elapsed from when the game has started, whether or not the performance of the selected piece of music has been terminated, or whether or not a predetermined dance evaluation has been maintained at a particular level or higher (step ST21). When the dance has not yet been terminated, the process returns to step ST9 where the displaying of the dance image D and the stepping position indication mark M onto the display surface 31 is continued, and processing of steps ST9 to ST19 is repeated in sequence for each one set of data.

Then, when it is determined that the game has been terminated, the evaluation result for the dance of the player, which is the final contents of the rhythm setting section 107, is displayed on the display surface 31 (step ST23), notifying the player.

Figure 12:
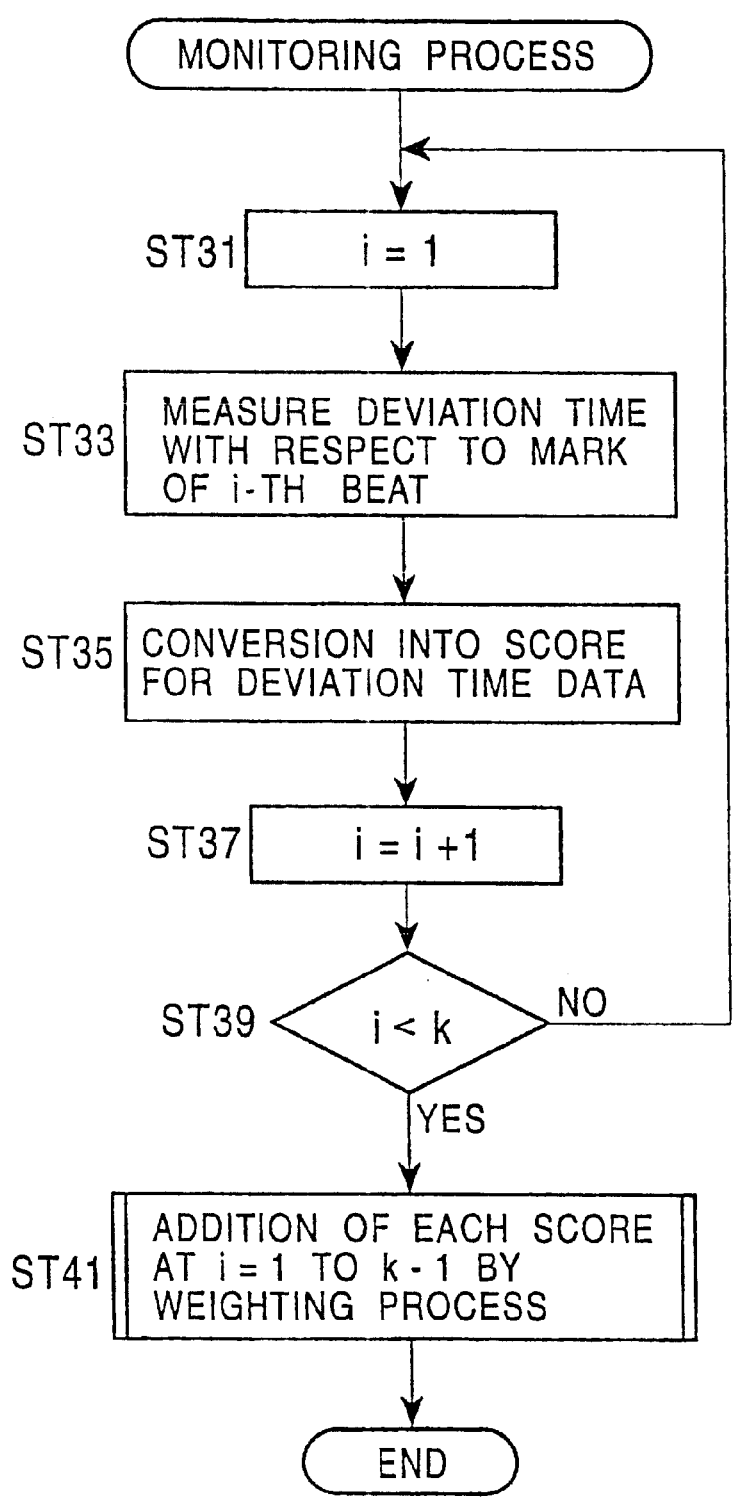
FIG. 12 is a flowchart showing a subroutine of a "monitoring process" of step ST11.

FIG. 12 is a flowchart showing a subroutine of a "monitoring process" of step ST11. In the figure, a variable i which indicates the number of beats in one set of data is set to 1 (step ST31). Initially, an ON signal from the cable switch 23, which is actually obtained from the stepping operation monitor section 112, with respect to the position indication mark M of the first beat, is detected, and the itime deviation of the actual stepping time with respect to the time at which the mark M completely overlaps the still mark S is measured as deviation time data (step ST33). This measurement is performed in such a way that a cycle for one beat is set by dividing it by ±½ cycle in the time direction (in the stroke direction of the mark M) by using the still mark S as a reference and that the time difference between the actually detected stepping time and the time at which the mark M completely overlaps the still mark S within this divided period is measured. Since the time at which the mark M completely matches the still mark S can be obtained by calculations from the cycle for one beat, the deviation time data is obtained from the time when the ON signal which is input on the condition that the corresponding step-on base section 13 is stepped on, from the stepping operation monitoring section 111 is detected. When an incorrect step-on base section 13 is stepped on, this is handled as not being stepped on, or a negative evaluation, which is more severe, may be given. Alternatively, the number of times of this incorrect stepping operation may be counted, and when the number of times reaches a predetermined count, the game may be forced to terminate.

Then, the duration between the timing deviated by an amount of ½ cycles and the timing at which both the marks M and S completely overlap each other is converted into, for example, 0 to 100 points and is represented (step ST35). For example, when the actual stepping operation is performed at the time deviated by ½ cycles in either of the ±direction, a 0 point is set, and when the actual stepping operation is performed at the time when both the marks M and S completely overlap each other, 100 points is set.

When the score conversion of the deviation time data for the mark M for one beat is terminated, next, the variable i is incremented by 1 (step ST37), and it is determined whether or not the variable i is less than a predetermined number K (step ST39). When the one set of data is formed of four beats, a value 5 is set to the predetermined number K, and when the one set of data is formed of eight beats, a value 9 is set to the predetermined number K, in such a manner as to correspond to the number of beats possessed by the table selected in the stepping position indication data memory 105. When it is assumed that one set of data is formed of four beats and the variable i is less than 5, the process returns to step ST33 where a score is determined for the next mark M in a manner similar to that described above. Then, when the variable i reaches 5 (YES in step ST39), a score for four beats is obtained and consequently, a score process is performed to obtain an evaluation for the one set of data by multiplying each score in variable i=1 to 4 by a weight coefficient (step ST41). For example, since being in time to rhythm is more difficult for the second and fourth beats in comparison with the first and third beats, for the weight coefficient, the scores for the first and third beats are multiplied by 12.5%, the score for the second beat is multiplied by 25%, and the score for the fourth beat is multiplied by 50%, so that a score at the full 100 points is calculated. The weight coefficient in a case in which one set of data is formed of eight beats may be appropriately divided so that the total is 100%. Also, a desired value is set to the weight coefficient, or the coefficient may be uniformly set to 25% (mode of four beats) or 12.5% (mode of eight beats).

Figure 13:
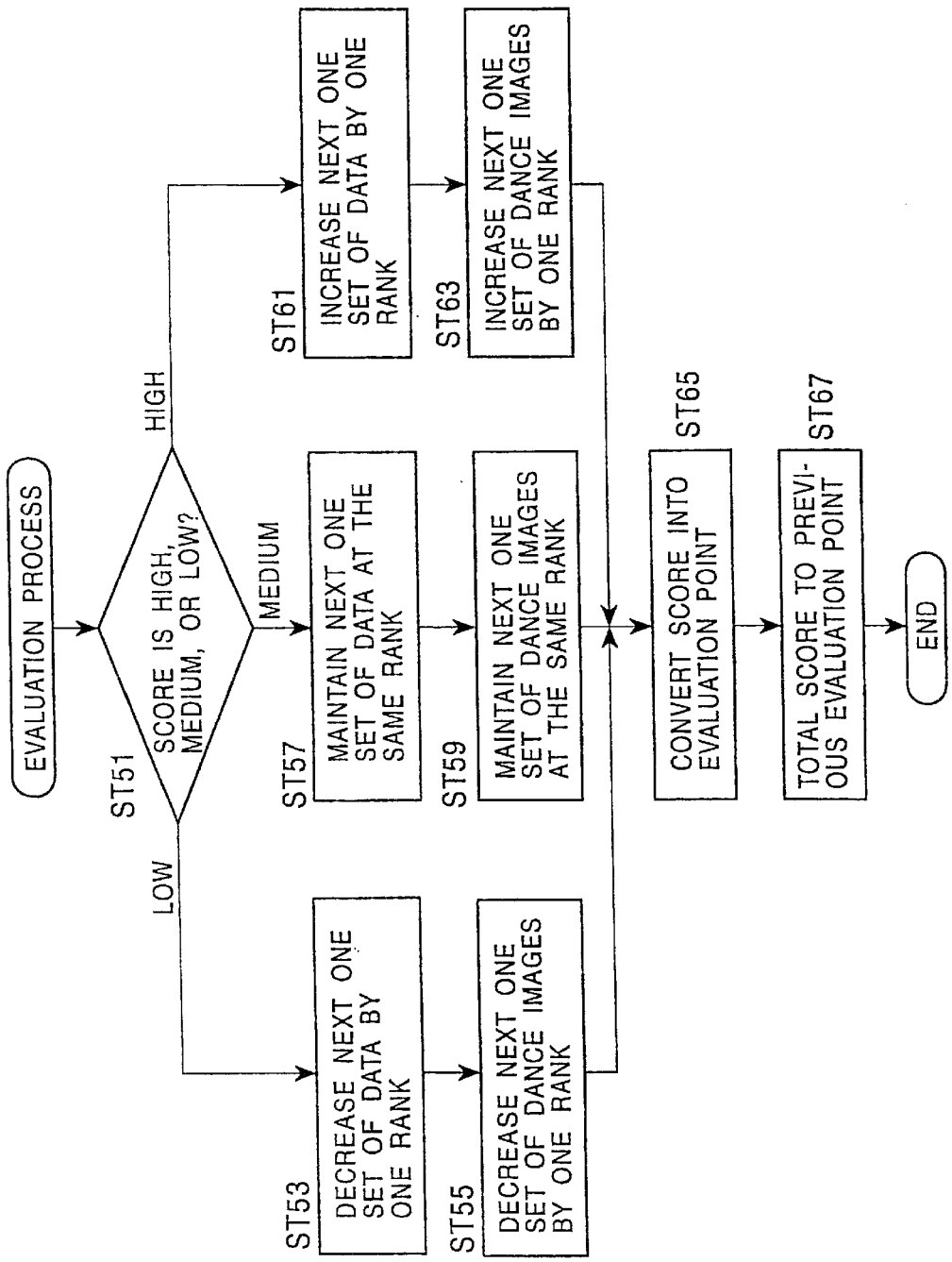
FIG. 13 is a flowchart showing a subroutine of an "evaluation process" of step ST15.

FIG. 13 is a flowchart showing a subroutine of an "evaluation process" of step ST15. In the figure, a determination is made as to whether the score obtained in step ST41 is high, medium, or low. The score is high when the score is from 80 to 100, medium when the score is from 21 to 79, and low when the score is from 0 to 20.

When the score is 20 points, for the one set of data to be set next, one set of data whose level of difficulty is decreased by one rank with respect to this rank is set (step ST53), and also for the dance image D to be set next, a dance image whose level of difficulty is decreased by one rank with respect to this rank is set (step ST55). When the score is between 21 and 79, for the one set of data to be set next, one set of data whose level of difficulty is at the same rank as this rank is set (step ST57), and also for the dance image D to be set next, a dance image whose level of difficulty is at the same rank as this rank is set (step ST59). Both the table for stepping position indication data and the table for the dance image D store a plurality of types with respect to the same level of difficulty, and in the data setting of the same rank, types of data which are as different as possible may be set. For example, the data may be changed in the direction of the level of difficulty shown in FIGS. 6A and 6B within the range of the data of the same rank, or may be randomly set from within the same rank. In contrast, when the score is from 80 to 100 points, for the one set of data to be set next, one set of data whose level of difficulty is increased by one rank with respect to this rank is set (step ST61), and also for the dance image D to be set next, a dance image whose level of difficulty is increased by one rank with respect to this rank is set (step ST63).

When a setting process for the next stepping position indication data and the next dance image is terminated, the score at this time is converted into evaluation points (step ST65) and is totaled to the evaluation points immediately before (step ST67).

Figure 10A:
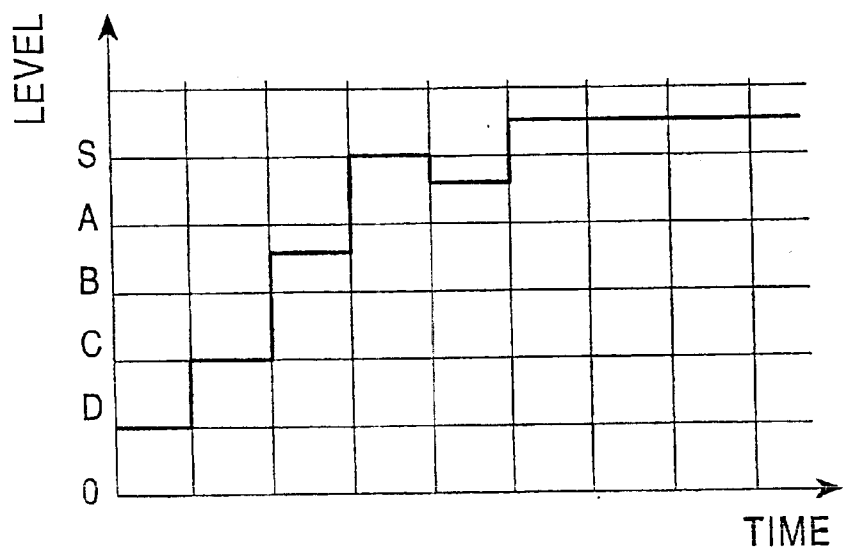
FIGS. 10A and 10B are illustrations of an evaluation point.
Figure 10B:
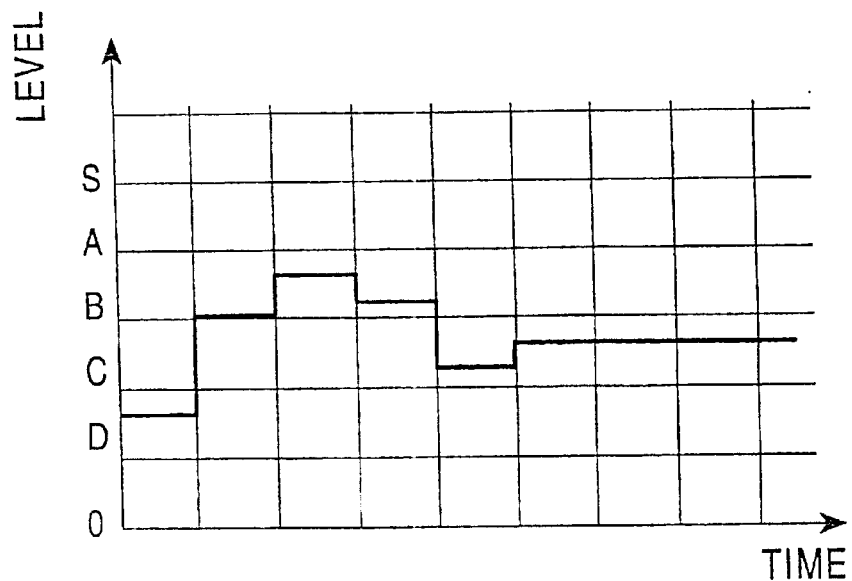

FIGS. 10A and 10B illustrate the evaluation points. FIG. 10A is a diagram showing a state in which the evaluation points are increased and maintained at a high level. FIG. 10B is a diagram showing a state in which the evaluation points are slightly increased but thereafter are maintained at a low level. The horizontal axis indicates time, with the fine line indicating the time width of one set of data, and the vertical axis indicates the rank, with the fine line indicating the width of each rank from the highest rank S to the lowest rank D. By performing an evaluation on each one set of data as shown in FIGS. 10A and 10B and by totaling the evaluation each time, a final evaluation can be obtained, and therefore, it is possible to effectively announce to the player the rhythmic sense and the dancing ability of the player.

Other embodiments may be adopted for the present invention.

(1) Although in this embodiment an evaluation is performed for the stepping operation by the player, the embodiment may be simply a game in which the floor panel is stepped on in accordance with stepping position instructions. Various placements of the stepping base section which is a stepping position may be conceivable; the auxiliary base sections 14 in oblique directions may also be used as stepping base sections, and/or also for the home position section 12 in the center, all positions of the floor panel may be objects for stepping operation instructions in a manner similar to the stepping base section. Alternatively, stepping base sections may be disposed annularly around the home position section 12. Also, the mark is not limited to an arrow, and may be a character, a symbol, etc., and a mark which is the same as, or which corresponds to, the mark drawn on the step-on base section 13 need only be adopted. Also, the stepping operation instruction is not limited to an instruction for each one, and may instruct two stepping base sections at the same time (both-feet mode).

(2) Although in this embodiment both the stepping position and the stepping operation timing are guided by the monitor 3, the embodiment may be one in which only the stepping position is instructed. Also, depending upon the type of game, this method may be applied to a game in which only the stepping timing is instructed.

(3) Although in this embodiment a stepping operation instruction is performed by the monitor 3, the fluorescent tube 2f, the cold cathode-ray tubes 26, and the rhythm speaker 2c, the stepping operation instruction may be performed by using one of them. In the embodiment in which the stepping operation instruction is performed by the monitor 3, this is preferable in visually guiding the stepping timing. Also, in place of the stepping position indication mark, a character for guiding a dance may be displayed on a monitor, and display control may be performed so that this guide is made to perform a stepping operation instruction.

(4) In this embodiment, an evaluation is performed in such a manner as to be sequentially totaled in units of one set of data, the evaluation at the final time is made to be the evaluation of the player, and this is displayed (and may also take the form of an announcement by a speaker). When this is done, there is a tendency for the evaluation to be low, for example, in a case in which the performance of the player is poor only in the second half. In place of this, the evaluation contents for each one set of data may be weight-averaged to obtain the overall evaluation. In addition, various evaluation methods may be used.

(5) Although in this embodiment a deviation time is converted into a score and this is used as an element for changing the rank of difficulty of one set of data, a direct determination from the deviation time is also possible.

(6) In place of the music title selection section 103, the type of rhythm may be selectable, and pieces of music appropriate for rhythm may be stored in a corresponding manner and may be played.

(7) Although in this embodiment the construction is formed in such a way that a stepping operation instruction is made possible individually by a plurality of stepping bases, the embodiment can also be applied to a dance game in which a stepping operation instruction, a stepping timing instruction, or both are performed collectively without making distinctions between a plurality of stepping bases.

(8) Although in this embodiment the construction is formed in such a way that the smaller the deviation time, the higher the evaluation, and this is announced (for example, displayed), in place of the announcement of the evaluation, it is also possible to directly inform (including displaying) the player of the deviation time in a mode which can be recognized by the player.

(9) Although in this embodiment a stepping operation instruction for a stepping base section is performed based on the performance of a piece of music, in the present invention, the performance of the piece of music is not always required, and the present invention can also be applied to a game apparatus which performs only a stepping operation instruction by display, light, sound, audio, etc., from the guidance means.

(10) Also, the positions at which the cable switches are placed are not limited to the edges in this embodiment, and may be in the corner portions.

(11) Although in this embodiment one set of data to be set is set delayed by one set of data in relation to image interruption prevention in the scroll display, and it may be delayed by two sets of data. Also, in the case of a mode in which scroll display is not performed, since the one set of data need not particularly be delayed by one, the data can also be set as the data immediately thereafter. Also, in this embodiment in which scroll display is performed, the rank of the one set of data which is delayed by one is determined by using the evaluation for the one set of data for the object of evaluation. However, the rank of the one set of data which is delayed by one with respect to the rank of the one set of data which is set (which is currently being displayed on the monitor 3) immediately before by using this evaluation may be set.

The present invention may further provide a dance game apparatus comprising: music output means for outputting one piece of music from at least one stored piece of music; a floor panel having a step-on base section; and guidance means for performing a stepping operation instruction to the step-on base section in time with the music, wherein the step-on base section comprises a panel disposed on the top and first illumination means provided in the inside space thereof, and the guidance means performs a stepping operation instruction in response to the flashing operation of the first illumination means. With this construction, since the place at which the stepping operation is to be performed flashes to directly guide the stepping position, this guidance is easy to understand.

Furthermore, the present invention may provide a dance game apparatus comprising: music output means for outputting one piece of music from at least one stored piece of music; a floor panel having a step-on base section; and guidance means for performing a stepping operation instruction to the step-on base section in time with the music, wherein the guidance means comprises first display means disposed in front of the floor panel and performs a stepping operation instruction in response to a display on the first display means. With this construction, it is possible for the player to visually recognize the guidance of the stepping position from the first display means naturally without directing the line of sight of the player in a special direction.

In each of the constructions described above, if the feature is that the stepping operation instruction by the guidance means further instructs the stepping timing, it is possible to provide a game which is dependent on response characteristics, agility characteristics, etc., of the player with respect to the guidance.

Furthermore, in the above-described construction, when the floor panel is formed in such a way that a plurality of stepping base sections are arranged and each stepping base section can instruct a stepping operation by the guidance means, it is possible to guide a plurality of stepping positions, the game characteristics are further improved, and a complex dance game is possible. Furthermore, by making the stepping operation instruction by the guidance means instruct both the stepping timing and the stepping base section to be stepped on, it is possible to provide a more sophisticated and powerful game.

Also, each of the constructions described above may comprise detection means for detecting a stepping operation on the step-on base section; measurement means for measuring a time deviation between the timing of a stepping operation instruction and the timing at which the fact that the step-on base section is stepped on is detected by the detection means; and evaluation means for providing a higher evaluation the smaller the measurement result. With this construction, since an evaluation is performed on the dancing ability of a player, it is of absorbing interest, and the game characteristics are improved. Furthermore, the construction is formed in such a way that the step-on base section comprises a top panel and a support member which supports the panel, the detection means comprises a stepping-on sensor interposed between the panel and the support member at mutually opposing positions of the panel, furthermore, the stepping sensor is formed of a switch having an elastically deformable construction, and the switch comprises first and second conductive members disposed in parallel in such a manner as to be spaced by a predetermined distance; a relay conductive member for providing a variation of electrical open-circuit and short-circuit between the first and second conductive members by moving toward or away from the first and second conductive members; and an elastic support member which supports the relay conductive member and which supports the first and second conductive members at a position at which the elastic support member can contact the relay conductive member when a load is received and at a position which is spaced by a very small distance from the relay conductive member. Thus, the stroke of the switch with respect to the stepping operation can be shortened, and the response characteristics of the switch are improved. By an amount corresponding to the improved response characteristics, the present invention is preferably used in a game in which timing is important.

Also, the construction is formed in such a way that the guidance means comprises stepping operation instruction content storage means for storing a plurality of types of stepping operation instruction contents having different levels of difficulty, and a stepping operation instruction having a level of difficulty corresponding to the evaluation result from the evaluation means is selectively output from the stepping operation instruction content storage means. This makes it possible to provide a stepping operation instruction of a level corresponding to the dancing ability of the player, making it possible for both a novice and an experienced person to enjoy this game.

Also, there is provided moving-picture storage means for storing a plurality of types of dance moving-pictures having different qualities corresponding to the levels of difficulty of a stepping operation instruction which can be selectively output by the guidance means; second display means for displaying a moving picture; and moving-picture display control means for outputting a dance moving-picture corresponding to the level of difficulty of the selected stepping operation instruction from the moving-picture storage means and for guiding the dance moving-picture onto the second display means. Thus, it is possible for a player to visually confirm his or her own dancing ability, and it is possible to provide a game having a high level of powerfulness.

In each of the constructions described above, if the music output means comprises speakers for low frequencies which output rhythm sounds; and a second illumination means which performs flashing of light in time to the rhythm of the music, provided around the low-frequency speakers, the rhythm sensations are further increased, and it is possible to enjoy a powerful game.

Also, in a step-on base for a dance game, the step-on base comprising: a top panel; a support member for supporting the panel; and detection means for detecting the action of a load on the panel, the detection means comprising stepping sensors interposed between the panel and the support member at mutually opposing positions of the panel, the construction is formed in such a way that the stepping-on sensor comprises a switch having an elastically deformable construction, and the switch comprises first and second conductive members disposed in parallel in such a manner as to be spaced by a predetermined distance; a relay conductive member for providing a variation of electrical open-circuit and short-circuit between the first and second conductive members by moving toward or away from the first and second conductive members; and an elastic support member which supports the relay conductive member and which supports the first and second conductive members at a position at which the elastic support member can contact the relay conductive member when a load is received and at a position which is spaced by a very small distance from the relay conductive member. Thus, the stroke of the switch can be decreased in comparison with, for example, an ordinary mechanical switch which is switched on as a result of movement of a movable contact piece, and the response characteristics of the switch with respect to the stepping operation are improved. By an amount corresponding to the improved response characteristics, the present invention is suitably used in a game, such as a dance game, in which importance is placed on stepping timing.

Also, if switches are disposed in opposing edges, even if the stepping position slightly deviates from the center of the panel, reliable detection is possible. In the above-described construction, since the construction is formed in such a way that a load receiving member is interposed in a part in the edge direction between the panel and the switch, it is possible to apply a load required for detection to the switch without being significantly influenced by the magnitude of the load by the weight of the player, making it possible to improve the reliability of the switch.

Furthermore, regarding the above-described game operation, the stepping position instruction (guidance) method, the stepping monitoring method, the evaluation method, etc., sufficiently constitute an invention.

According to the present invention, the construction is formed in such a way that a floor panel construction capable of representing rhythm sensations by using the whole body in time to music is adopted, and stepping is performed in accordance with the contents which are instructed in sequence. This makes it possible to provide a dance game apparatus which has powerfulness and creates rhythm sensations, which has not been possible hitherto.

According to the present invention, since the guidance of a stepping position is directly performed at a place where a stepping operation is to be performed, an easy-to-understand guide can be provided.

According to the present invention, it is possible to visually recognize the guidance of a stepping position from the first display means as it is without directing the line of sight of a player in a special direction, thereby being suitable for a dance game.

According to the present invention, it is possible to provide a game which is dependent on response characteristics, agility characteristics, etc., of a player with respect to a guidance.

According to the present invention, it is possible to guide a plurality of stepping positions, making it possible to provide a sophisticated and powerful dance game.

According to the present invention, furthermore, it is possible to provide a game which is more sophisticated and which is powerful by making the stepping operation instruction by the guidance means instruct both a stepping timing and a stepping base section to be stepped on.

According to the present invention, since the dancing ability of a player is evaluated, it is possible to provide a game which is compelling and sophisticated.

According to the present invention, since stepping sensors are provided at opposing positions of the panel, even if any position on the panel is stepped on during dancing, that is, even if a position deviating from the center of the panel is stepped on, it is possible to reliably and suitably detect the stepping operation by a sensor on a side nearer thereto.

According to the present invention, since a switch using elastic deformation is used, the stroke of the switch with respect to the stepping operation can be shortened, and the response characteristics of the switch are improved. By an amount corresponding to the improved response characteristics, the present invention is suitably used for a game in which timing is important.

According to the present invention, since a stepping operation instruction at a level appropriate to the dancing ability of a player can be provided, it is possible for both a novice and an experienced person to enjoy this game.

According to the present invention, it is possible for a player to visually recognize his or her own dancing ability, and it is possible to provide a game having a high level of powerfulness.

According to the present invention, it is possible to provide a game having powerfulness, in which rhythm sensations are increased further.

According to the present invention, since the construction is formed in such a way that stepping sensors are provided at opposing positions of the panel, even if any position of the panel is stepped on during dancing, that is, even if a position deviating from the center of the panel is stepped on, it is possible to provide a step-on base for a dance game, which can reliably and suitably detect the stepping operation by a sensor on a side nearer thereto.

According to the present invention, the stroke of a switch is decreased in comparison with an ordinary mechanical switch which is switched on as a result of a movable piece being moved, and the response characteristics for the stepping operation are improved. By an amount corresponding to the improved response characteristics, the present invention can be suitably applied to a game, such as a dance game, in which stepping timing is important. Also, since each conductive member is supported by an elastic support member, a buffer role is performed with respect to a large stepping load, and a longer service life can be achieved.

According to the present invention, since switches are disposed at opposing edges, even if the stepping position slightly deviates from the center of the panel, quick and reliable detection can be performed.

According to the present invention, it is possible to apply a load required for detection to a switch without being significantly influenced by the magnitude of the weight of the player, making it possible to improve the reliability of the switch even more.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A dance game for use by a game player comprising:
    an output device for outputting a stored rhythmic piece;
    a floor panel having a plurality of step-on-sections having different floor panel indicia, each of said step-on sections outputting a step-on signal when step-on contact is applied to each step-on section by the dance game player;
    a display unit displaying first display indicia in which each first display indicia has a recognizable relationship with a corresponding floor panel indica, said display unit also displaying a second display indicia in which each second display indicia has a recognizable relationship with a respective corresponding first display indicia;
    a guidance unit for controlling the relative movement between the first indicia and the second display indicia such that each first display indicia sequentially establishes a mating relationship with a respective corresponding second display indicia in timed relationship with said rhythmic piece such that said dance game player is instructed to sequentially step-on the different step-on sections in timed relationship with the sequential establishment of said mating relationships and thereby in timed relationship with said rhythmic piece, said guidance unit outputting a guidance unit signal when said mating relationship is established; and
    an evaluation unit receiving said step-on signals and said guidance unit signals and providing an evaluation of the dance game player's performance based on said step-on signals and said guidance unit signals.

2. A dance game according to claim 1 wherein said first display indicia moves toward respective corresponding second indicia such that said mating relationship occurs when each first display indicia encounters a respective corresponding second indicia.

3. A dance game according to claim 1 wherein said display unit displays said first display indicia by scrolling.

4. A dance game according to claim 1 wherein said display unit displays said first display indicia by scrolling in a generally vertical direction.

5. A dance game according to claim 1 wherein said display unit displays said first display indicia such that each first display indicia moves along a separate locus with each locus being substantially parallel to one another.

6. A dance game according to claim 5 wherein said display unit displays each second indicia in the locus of the respective corresponding first display indicia.

7. A dance game according to claim 5 wherein said second display indicia are generally linearly aligned in a direction generally perpendicular to the parallel locus of said first display indicia.

8. A dance game according to claim 1 wherein said mating relationship is an overlapping relationship.

9. A dance game according to claim 1 wherein each floor panel indicia is substantially the same as the respective related first display indicia.

10. A dance game according to claim 1 wherein each floor panel indicia is substantially the same as the respective related second display indicia.

11. A dance game according to claim 1 wherein each second display indicia is substantially the same as the respective related first display indicia.

12. A dance game according to claim 1, wherein the first display indicia is a moving display indicia and the second display indicia is a stationary display indicia.

13. A game for use by a game player in conjunction with a rhythmic piece comprising:
    a panel having a plurality of pressure sensitive sections having different panel indicia, each of said pressure sensitive sections outputting a pressure sensitive signal when pressure is applied to each pressure sensitive section by the game player;
    a display unit displaying first display indicia in which each first display indicia has a recognizable relationship with a corresponding panel indica, said display unit also displaying second display indicia in which each second display indicia has a recognizable relationship with a respective corresponding first display indicia;
    a guidance unit for controlling the first display indicia such that each first display indicia establishes a mating relationship with a respective corresponding second display indicia in timed relationship with said rhythmic piece such that said game player is instructed to apply pressure to the different pressure sensitive sections in timed relationship with the establishment of said mating relationships and thereby in timed relationship with said rhythmic piece, said guidance unit outputting a guidance unit signal when said mating relationship is established; and
    an evaluation unit receiving said pressure sensitive signals and said guidance unit signals and providing an evaluation of the game player's performance based on said pressure sensitive signals and said guidance unit signals.

14. A game for use by a game player in conjunction with a rhythmic piece comprising:

a panel having a plurality of contact sections, each of said contact sections outputting a contact signal when contacted by the game player;

a display unit displaying first displays in which each first display has a recognizable relationship with a corresponding contact section of said panel, said display unit also displaying second displays in which each second display has a recognizable relationship with a respective corresponding moving display;

a guidance unit for controlling the first displays such that each first display establishes a mating relationship with a respective corresponding second display in timed relationship with said rhythmic piece such that said game player is instructed to contact the different contact sections in timed relationship with the establishment of said mating relationships and thereby in timed relationship with said rhythmic piece, said guidance unit outputting a guidance unit signal when said guidance unit relationship is established; and an evaluation unit receiving said contact signals and said guidance unit signals and providing an evaluation of the game player's performance based on said contact signals and said guidance unit signals.

* * * * *